(12) United States Patent
Cong et al.

(10) Patent No.: US 12,044,927 B2
(45) Date of Patent: Jul. 23, 2024

(54) DISPLAY APPARATUS

(71) Applicant: HISENSE VISUAL TECHNOLOGY CO., LTD., Shandong (CN)

(72) Inventors: Xiaodong Cong, Shandong (CN); Yu Han, Shandong (CN); Yi Zou, Shandong (CN); Ximin Feng, Shandong (CN); Guangjun Yuan, Shandong (CN); Zhirui Zhang, Shandong (CN); Guangqing Yang, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 18/457,820

(22) Filed: Aug. 29, 2023

(65) Prior Publication Data
US 2023/0400731 A1     Dec. 14, 2023

Related U.S. Application Data

(63) Continuation of application No. PCT/CN2021/121615, filed on Sep. 29, 2021.

(30) Foreign Application Priority Data

Apr. 9, 2021 (CN) .......................... 202110387573.4
Apr. 12, 2021 (CN) .......................... 202120739189.1

(51) Int. Cl.
G02F 1/13357       (2006.01)

(52) U.S. Cl.
CPC .. *G02F 1/133608* (2013.01); *G02F 1/133603* (2013.01); *G02F 1/133605* (2013.01)

(58) Field of Classification Search
CPC ......... G02F 1/133608; G02F 1/133603; G02F 1/133605
See application file for complete search history.

(56) References Cited

U.S. PATENT DOCUMENTS 11,435,611 B2 *  9/2022  Chae .................. G02F 1/133308
2018/0341150 A1 *  11/2018  Lee .................... G02F 1/133308
(Continued)

FOREIGN PATENT DOCUMENTS

CN      101368706 A     2/2009
CN      201284988 Y     8/2009
(Continued)

OTHER PUBLICATIONS

Chinese First Office Action, mailed Sep. 9, 2023, from Chinese App. No. 202110387573.4, 16 pages.
(Continued)

*Primary Examiner* — Kevin Quarterman
(74) *Attorney, Agent, or Firm* — Workman Nydegger

(57) ABSTRACT

Disclosed is a display apparatus. The display apparatus includes: a display panel and a backlight module; where the backlight module includes: a back plane including a plane portion and an inclined portion surrounding the plane portion, where the inclined portion inclines toward a light emitting side of the backlight module, and the inclined portion and the plane portion are arranged at a configured angle; a light board, arranged on the plane portion of the back plane; a split reflector plate, including a main reflector plate and side reflector plates; where the main reflector plate is arranged on a side of the light board facing away from the back plane, the side reflector plates are arranged on a side of the inclined portion of the back plane facing the light board, and splicing positions of the plurality of side reflector plates do not overlap with corner positions of the inclined portion.

10 Claims, 11 Drawing Sheets

(56) References Cited

U.S. PATENT DOCUMENTS

| | | | |
|---|---|---|---|
| 2019/0163021 A1* | 5/2019 | Jung | G02F 1/133611 |
| 2019/0324323 A1* | 10/2019 | Oh | G02F 1/133608 |
| 2020/0089054 A1* | 3/2020 | Lim | G02F 1/133605 |

FOREIGN PATENT DOCUMENTS

| | | |
|---|---|---|
| CN | 210720957 U | 6/2020 |
| CN | 111399280 A | 7/2020 |
| CN | 210982989 U | 7/2020 |
| CN | 211786492 U | 10/2020 |
| CN | 211979375 U | 11/2020 |
| CN | 212255964 U | 12/2020 |
| JP | 2000338503 A | 12/2000 |
| KR | 20080002134 A | 1/2008 |

OTHER PUBLICATIONS

International Search Report, mailed Nov. 30, 2021, from PCT/CN2021/121615, 5 pages.

* cited by examiner

DISPLAY APPARATUS

CROSS-REFERENCE TO RELATED APPLICATIONS

The present application is a continuation application of PCT Application No. PCT/CN2021/121615, filed Sep. 29, 2021, which claims priorities to Chinese Patent Application No. 202120739189.1 filed on Apr. 12, 2021 and Chinese Patent Application No. 202110387573.4 filed on Apr. 9, 2021, which are hereby incorporated by reference in their entirety.

FIELD OF THE INVENTION

The present application relates to the field of display technologies and particularly to a display apparatus.

BACKGROUND OF THE INVENTION

With the continuous development and maturity of the Light Emitting Diode (LED) backlight technology and the rapid expansion of the market, more and more product forms emerge, where the Mini LED backlight is attracting more and more attention, because the number of Mini LEDs used in the Mini LED backlight design is tens to hundreds of times that of the traditional backlight, and the number of Mini LEDs in a single light board used in the Mini LED backlight design is relatively large. Correspondingly, the reflector plate also needs to open a lot of holes. The traditional reflector plate can no longer meet the demand.

SUMMARY OF THE INVENTION

In some embodiments of the present application, a display apparatus includes: a back plane, a light board and a split reflector plate. The back plane includes a plane portion, an inclined portion and a bent portion; the inclined portion includes a sky-side inclined portion, a ground-side inclined portion, a left inclined portion and a right inclined portion; the sky-side inclined portion is connected with one end of the left inclined portion and one end of the right inclined portion respectively, the ground-side inclined portion is connected with the other end of the left inclined portion and the other end of the right inclined portion respectively, and the connected positions are corner positions of the inclined portion. The split reflector plate includes a main reflector plate and a plurality of side reflector plates, where the main reflector plate is arranged on a side of the light board facing away from the back plane, the plurality of side reflector plates are arranged on a side of the inclined portion of the back plane facing the light board. The splicing positions of the plurality of side reflector plates do not overlap with the corner positions of the inclined portion, and the splicing positions of the plurality of side reflector plates avoid the corner positions, thereby avoiding the shadow problem caused by the splicing deviation of the side reflector plates in the corner positions.

In some embodiments of the present application, the plurality of side reflector plates include: a sky-side reflector plate, a ground-side reflector plate, a left reflector plate and a right reflector plate. The sky-side reflector plate covers the sky-side inclined portion, and two ends of the sky-side reflector plate extend to the left inclined portion and the right inclined portion respectively, so that the splicing position of the sky-side reflector plate and the left reflector plate is located in the left inclined portion, and the splicing position of the sky-side reflector plate and the right reflector plate is located in the right inclined portion. The ground-side reflector plate covers the ground-side inclined portion, and two ends of the ground-side reflector plate extend to the left inclined portion and the right inclined portion respectively, so that the splicing position of the ground-side reflector plate and the left reflector plate is located in the left inclined portion, and the splicing position of the ground-side reflector plate and the right reflector plate is located in the right inclined portion.

In some embodiments of the present application, the bent portion in connection with the ground-side inclined portion is provided with a fine positioning point convex hull and a coarse positioning point convex hull; and a side of the ground-side reflector plate away from the plane portion has a fine positioning clamping slot matching with the fine positioning point convex hull and a coarse positioning clamping slot matching with the coarse positioning point convex hull. The ground-side reflector plate is designed for alignment according to the middle fine positioning and the left and right coarse positioning. The left and right coarse positioning is mainly configured to ensure that the ground-side reflector plate is not deviated in the up and down directions, and the middle fine positioning is mainly configured to ensure that the ground-side reflector plate is not deviated in the left and right directions, improving the stability of the mounting deviation of the ground-side reflector plate.

In some embodiments of the present application, a side of the sky-side inclined portion adjacent to the plane portion has a dent alignment mark line, and a side of the sky-side reflector plate adjacent to the plane portion has an alignment tangent line matching with the dent alignment mark line. During alignment and fitting, the sky-side reflector plate uses the alignment tangent line to match and position according to the corresponding dent alignment mark line, ensuring the centering design of the sky-side reflector plate, ensuring that the sky-side reflector plate is not deviated in the left and right directions, and improving the stability of the mounting deviation of the sky-side reflector plate. An edge of the sky-side inclined portion adjacent to the plane portion has a positioning groove, and an edge of the sky-side reflector plate adjacent to the plane portion has a positioning protrusion matching with the positioning groove of the sky-side inclined portion. The positioning protrusion is aligned with the positioning groove, ensuring that the sky-side reflector plate is not deviated in the up and down directions, and improving the stability of the mounting deviation of the sky-side reflector plate.

In some embodiments of the present application, an edge of the left inclined portion adjacent to the plane portion has a positioning groove, and an edge of the left reflector plate adjacent to the plane portion has a positioning protrusion matching with the positioning groove; an edge of the right inclined portion adjacent to the plane portion has a positioning groove, and an edge of the right reflector plate adjacent to the plane portion has a positioning protrusion matching with the positioning groove. The positioning protrusion is aligned with the positioning groove, ensuring that the left reflector plate and the right reflector plate are not deviated in the up and down directions, and improving the stability of the mounting deviation of the left reflector plate and the right reflector plate. Two ends of the sky-side reflector plate have edge alignment marks for locating edge positions of the left reflector plate and the right reflector plate respectively. The edge positions of the left reflector plate and the right reflector plate are aligned with the edge alignment marks, ensuring that the left reflector plate and the right reflector plate are not deviated in the left and right directions, and improving the stability of the mounting deviation of the left reflector plate and the right reflector plate.

In some embodiments of the present application, the left reflector plate overlaps with one edge of the sky-side reflector plate. In order to ensure the accurate alignment, the left reflector plate and the edge of the sky-side reflector plate are arranged perpendicular to the edge of the plane portion. The right reflector plate overlaps with the other edge of the sky-side reflector plate. In order to ensure the accurate alignment, the right reflector plate and the other edge of the sky-side reflector plate are arranged perpendicular to the edge of the plane portion.

In some embodiments of the present application, the backlight module includes a plurality of light boards and a plurality of main reflector plates, and the main reflector plates are mounted to the light boards in one-to-one correspondence. A size of a main reflector plate among the plurality of main reflector plates is larger than a size of a corresponding light board among the plurality of light boards. A gap with a set value is arranged between adjacent light boards among the plurality of light boards, and the gap is completely covered by a corresponding main reflector plate among the plurality of main reflector plates, so as to avoid the subjective problem caused by the gap defect between adjacent light boards and improve the subjective stability.

In some embodiments of the present application, there is an overlapping area between adjacent main reflector plates to ensure that the adjacent main reflector plates are in the stacked and overlapped state, effectively blocking the gap between adjacent light boards. The overlapping area between the adjacent main reflector plates is located in the gap between the light boards, and the overlapping area between the adjacent main reflector plates may be uneven. The overlapping area and one or more light boards among the plurality of light boards do not overlap with each other, so as to avoid the overlapping area from affecting the light emission of the light boards.

In some embodiments of the present application, a display apparatus includes: a display panel configured to display images, a light board configured to provide backlight to the display panel, and a full laminated reflector plate is full laminated with one side of the light board. A positioning bracket is fixed on the light board, and the full laminated reflector plate is configured to expose the positioning opening of the positioning bracket. During the full lamination of the full laminated reflector plate, the positioning hole of the full laminated reflector plate is positioned transiently and precisely from top to bottom from the top of the positioning bracket, and then laminated by a laminating fixture. Such design can ensure the flatness of the light board and the full laminated reflector plate after the full lamination, and improve the assembly stability.

In some embodiments of the present application, the display apparatus includes a plurality of light boards and full laminated reflector plates, where the full laminated reflector plates are mounted to the light boards in one-to-one correspondence, and one light board is correspondingly provided with two positioning brackets, to realize the double precise positioning of the full laminated reflector plates and light boards.

In some embodiments of the present application, the full laminated reflector plate includes: a base material with supporting and reflecting functions, and a glue layer arranged on one side of the base material facing the light board. The glue layer is configured to be full laminated with the light board. The material of the glue layer includes bilobal acrylic. The material of the base material includes PET.

In some embodiments of the present application, the full laminated reflector plate further includes: a scattered particle layer arranged on a side of the base material facing away from the glue layer and configured to increase the emergent direction of the reflected light.

In some embodiments of the present application, the light board includes: a circuit board configured to provide a drive signal, and a light emitting diode chip arranged on the circuit board; and the full laminated reflector plate includes an opening configured to expose the light emitting diode chip.

In some embodiments of the present application, the display apparatus further includes: a diffusion plate arranged on the light emitting side of the light board, and the positioning bracket further has the function of supporting the diffusion plate.

Figure 1:
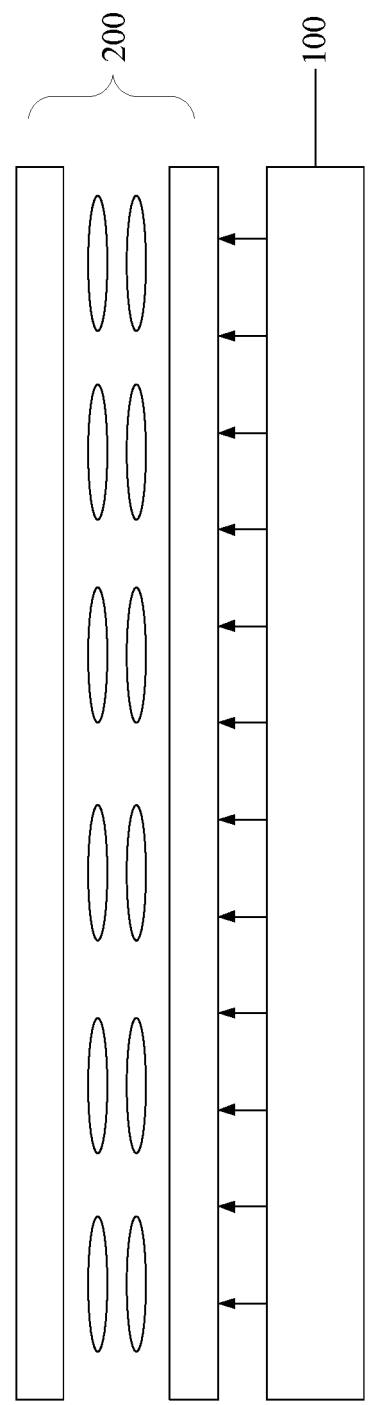
FIG. 1 is a schematic diagram of a cross-section structure of a display apparatus according to an embodiment of the present application.

Here, 100—backlight module, 200—display panel, 11—back plane, 12—light board, 13—split reflector plate, 14—diffusion plate, 15—optical film, 111—plane portion, 112—inclined portion, 113—bent portion, 112a—sky-side inclined portion, 112b—ground-side inclined portion, 112c—left inclined portion, 112d—right inclined portion, 1121—dent alignment mark line, 1131—fine positioning point convex hull, 1132—coarse positioning point convex hull, 121—circuit board, 122—light emitting diode chip, 124—packaging bracket, 12a—gap, 131—main reflector plate, 132—side reflector plate, 131a—overlapping area, 132a—sky-side reflector plate, 132b—ground-side reflector plate, 132c—left reflector plate, 132d—right reflector plate, 132a1—alignment tangent line, 132a2—edge alignment mark, 132b1—fine positioning clamping slot, 132b2—coarse positioning clamping slot, 31—positioning groove, 32—positioning protrusion.

DETAILED DESCRIPTION OF THE INVENTION

In order to make the above-mentioned objects, features and advantages of the present application more apparent, the present application will be further illustrated below in combination with the drawings and embodiments. However, the exemplary embodiments can be implemented in various forms and should not be understood as being limited to the embodiments described here; and on the contrary, these embodiments are provided to make the present application more comprehensive and complete, and the concept of the exemplary embodiments is fully conveyed to those skilled in the art. The same reference numbers represent same or similar structures in the figures, so the repeated description thereof will be omitted. The words expressing the positions and directions described in the present application are all intended to illustrate by taking the drawings as examples, but can also be changed as needed, where the changes made shall fall within the protection scope of the present application. The drawings of the present application are merely intended to illustrate the relative position relationship, but not intend to show the real proportion.

The Mini LED backlight technology is attracting more and more attention, because the number of Mini LEDs used in the Mini LED backlight design is tens to hundreds of times that of the traditional backlight and the number of Mini LEDs in a single light board is relatively large. Correspondingly, the reflector plate also needs to open a lot of holes. The design based on the traditional single reflector plate cannot meet mass production requirements. Meanwhile, it is difficult for the assembly of the reflector plate with thousands of Mini LED holes to guarantee the visual stability of the backlight, and the corner position of the traditional single reflector plate may cause shadow problem, so the scheme based on the traditional design cannot meet the design for manufacturability of the current Mini LED backlight.

A liquid crystal display apparatus mainly includes a backlight module and a liquid crystal display panel. The liquid crystal display panel itself does not emit light, and needs to rely on the light source provided by the backlight module to realize brightness display.

The imaging principle of the liquid crystal display apparatus is to place the liquid crystal between two pieces of conductive glass to be driven by the electric field between two electrodes, which causes the electric field effect of twisting the liquid crystal molecules, so as to control the transmission or shielding function of the backlight and thereby display the image. If a color filter is added, color images can be displayed.

FIG. 1 is a schematic diagram of a cross-section structure of a display apparatus according to an embodiment of the present application.

Referring to FIG. 1, the display apparatus includes: a backlight module 100 and a display panel 200, where the backlight module 100 is configured to provide a backlight source to the display panel 200, and the display panel 200 is configured to display images.

The display panel 200 is arranged on the light emitting side of the backlight module 100, and the shape and size of the display panel usually match with the backlight module. In some embodiments, the display panel 200 may be configured as a rectangle, including the sky side, the ground side, the left side and the right side, where the sky side is opposite to the ground side, the left side is opposite to the right side, the sky side is respectively connected with one end of the left side and one end of the right side, and the ground side is respectively connected with the other end of the left side and the other end of the right side.

The display panel 200 is a transmissive display panel, which can modulate the transmittance of light, but does not emit light itself. The display panel 200 has a plurality of pixel units arranged in an array, where each pixel unit may independently control the transmittance and color of the light incident to the pixel unit from the backlight module 100, so that the light transmitted by all the pixel units constitutes the displayed image. The backlight module 100 is generally arranged at the bottom of the display apparatus, and the shape and size of the backlight module 100 are adapted to the shape and size of the display apparatus. When applied to products such as television or mobile terminal, the backlight module usually adopts the rectangular shape.

The backlight module in the embodiments of the present application is a direct-type backlight module, which is configured to emit light uniformly on the entire light emitting surface, and provide the uniformly distributed light with sufficient brightness for the display panel, so that the display panel can display images.

Figure 2:
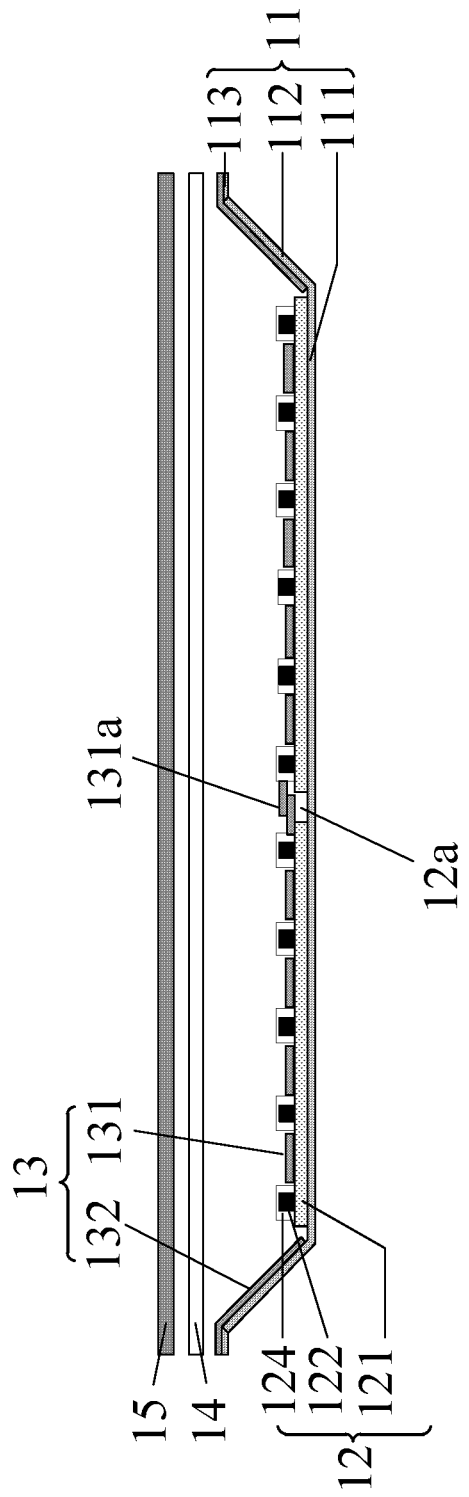
FIG. 2 is a schematic diagram of a cross-section structure of a backlight module according to an embodiment of the present application.
Figure 3:
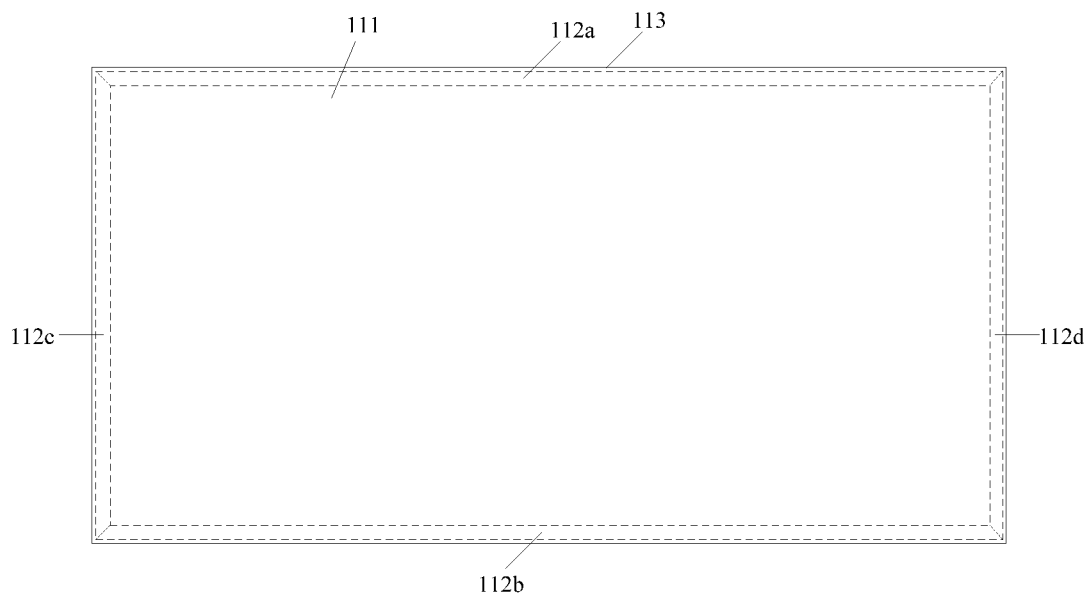
FIG. 3 is a schematic diagram of a top-view structure of a back plane according to an embodiment of the present application.

FIG. 2 is a schematic diagram of a cross-section structure of a backlight module according to an embodiment of the present application. FIG. 3 is a schematic diagram of a top-view structure of a back plane according to an embodiment of the present application.

Referring to FIG. 2, the backlight module includes: a back plane 11, a light source, a split reflector plate 13, a diffusion plate 14 and an optical film 15. In some embodiments of the present application, the light source is provided in the form of a light board 12.

The back plane 11 is arranged at the bottom of the backlight module and has support and bearing functions. In an embodiment of the present application, the back plane 11 includes a plane portion 111, an inclined portion 112 and a bent portion 113.

Here, the plane portion 111 of the back plane 11 is arranged at the bottom and is generally a square or rectangular structure. When applied to a special-shaped display apparatus, the shape of the plane portion 111 is adapted to the shape of the display apparatus.

The plane portion 111 is configured to support the light board 12, the inclined portion 112 is arranged around the plane portion 111, and the inclined portion 112 is bent to one side of the back plane along the edge of the plane portion 111. In some embodiments, the included angle between the inclined portion 112 and the plane portion 111 is 30° to 90°, and for example, may be 45°. The bent portion 113 is bent to one side of the back plane along the edge of the inclined portion 112 away from the plane portion 111, the bent portion 113 is parallel to the plane portion 11, and the bent portion 113 has functions such as bearing and supporting the edge positions of components such as an optical film. In some embodiments, the plane portion 111, the inclined portion 112 and the bent portion 113 are an integral structure.

Referring to FIG. 3, the inclined portion 112 of the back plane 11 includes: a sky-side inclined portion 112a, a ground-side inclined portion 112b, a left inclined portion 112c, and a right inclined portion 112d, where the sky-side inclined portion 112a is opposite to the ground-side inclined portion 112b, the left inclined portion 112c is opposite to the right inclined portion 112d, the sky-side inclined portion 112a is respectively connected with one end of the left inclined portion 112c and one end of the right inclined portion 112d, and the ground-side inclined portion 112b is respectively connected with the other end of the left inclined portion 112c and the other end of the right inclined portion 112d. In some embodiments, the included angles between the sky-side inclined portion 112a, ground-side inclined portion 112b, left inclined portion 112c and right inclined portion 112d and the plane portion 111 may be the same. The dotted lines in FIG. 3 represent the bent lines among the plane portion 111, the inclined portion 112 and the bent portion 113, and the boundary line between the inclined portions 112.

The back plane 11 can usually be made of materials, such as electro-galvanized steel sheet (SECC) or hot-dip galvanized steel sheet (SGCC) or other material, with a thickness of 0.8 cm to 1.0 cm. In some embodiments, the back plane 11 may be made from aluminum, iron, aluminum alloy, iron alloy or other material.

The back plane 11 also plays a role of heat dissipation for the light board 12.

In an embodiment of the present application, the backlight module is a direct-type backlight module, the light board 12 is used as the backlight source, and the light board 12 is arranged on the plane portion 111 of the back plane 11. In some embodiments, the overall shape of the light board 12 may be square or rectangular. When applied to a special-shaped display apparatus, the shape and size of the light board 12 are adapted to the shape and size of the display apparatus.

According to the size of the display apparatus, a plurality of light boards 12 may be provided, and the light boards 12 jointly provide the backlight by splicing. In order to avoid the optical problem caused by splice of the light boards 12, the seams between the adjacent light boards 12 should be as small as possible, and even the seamless splicing is required. However, during fabrication procedure, the seamless splicing cannot be achieved due to the limitation of the process, so there will be a gap 12a of a set value between adjacent light boards 12.

A plurality of light boards 12 may be provided according to the size of the display apparatus. For example, a 75-inch TV can use splice of 2*8 light boards 12 to jointly provide the backlight.

In some embodiments, referring to FIG. 2, the light board 12 includes: a circuit board 121, a light emitting diode chip (i.e., LED chip) 122 and a packaging bracket 124. Each light emitting diode chip 122 serves as one light emitting unit.

No lens is provided on the light board 12 in the embodiments of the present application, and the distance between the light emitting diode chips 122 on the light board 12 is relatively small. The circuit board 121 is arranged on the plane portion 111, and the shape of the circuit board 121 is substantially same as the overall shape of the light board 12. Under normal circumstances, the circuit board 121 is plate-shaped and is generally rectangular or square.

In an embodiment of the present application, the circuit board 121 can be a Printed Circuit Board (PCB), which includes a substrate and a conductive layer. The conductive layer is deposed on the substrate by electroplating the conductive material, and then the line is etched to form a circuit as required. The conductive layer can be made of copper.

The substrate of the circuit board 121 can be made from materials such as FR4, aluminum base or glass. Alternatively, the base or the base substrate of the circuit board 121 may be made from flexible materials to form a flexible display apparatus.

FIG. 2 shows that the light emitting diode chip is packaged by the POB (Package on Board) packaging method, where a packaging bracket 124 may be provided outside the light emitting diode chip 122. The packaging bracket 124 is configured to package and protect the light emitting diode chip 122, and prevent foreign objects from entering into the light emitting diode chip 122.

In the embodiments of the present application, when the light emitting diode chip is packaged by the POB packaging method, a patch electrode may be formed on the lower surface at the same time, where the patch electrode is electrically connected with the corresponding electrode of the light emitting diode chip. After packaging, the packaged light emitting diode chip 122 is patched onto the corresponding position of the circuit board 121. The POB packaging method has mature technology and good adaptability. In some embodiments, a single packaging bracket 124 and a single light emitting diode chip 122 form a light emitting device.

The POB packaging method is to firstly package the light emitting diode chip into a single LED lamp bead through the packaging bracket, and then place the lamp bead on the circuit board.

In some embodiments of the present application, the light emitting diode chip is packaged by the COB (Chip On Board) packaging method, where the light emitting diode chip 122 is firstly welded onto the corresponding pad of the circuit board 121, and then the light emitting diode chip 122 is packaged by dispensing glue on the surface of the light emitting diode chip 122. The packaging glue is protective glue covering the surface of the light emitting diode chip 122 facing away from the circuit board 121. The packaging glue is configured to package and protect the light emitting diode chip 122, and prevent foreign objects from entering into the light emitting diode chip 122. That is, the packaging bracket is no longer used. The packaging glue can be made of transparent colloidal material, such as silica gel with better permeability, modified silica gel or epoxy resin, etc. The COB packaging method has higher efficiency and lower cost. The circuit board 121 is configured to provide a drive electrical signal to the light emitting diode chip 122. The light emitting diode chip 122 and the circuit board 121 are fabricated separately. The surface of the circuit board 121 includes a plurality of pads for welding the light emitting diode chip 122. After the fabrication is completed, the light emitting diode chip 122 is transferred to the top of the pad and is welded onto the circuit board 121 by reflow welding and other processes, so that the light emitting diode chip 122 can be driven to emit light by controlling the input signal of the circuit board 121. The light emitting diode chip 122 is located on the circuit board. The electrodes of the light emitting diode chip 122 are welded on the exposed pads of the circuit board 121 to realize the electrical connection therebetween.

The light board 12 may include light emitting diode chips 122 in only one color, or may include light emitting diode chips 122 in multiple colors, which is not limited here.

The size of the chip used by the light emitting diode chip 122 is at the micron level. Since the size of the light emitting diode chip 122 is very small, it is beneficial to control the dynamic light emission of the backlight module to a smaller partition, thus realizing more refined dynamic control and improving the dynamic contrast ratio of the display apparatus.

In some embodiments of the present application, the size of the light emitting diode chip 122 is below 500 μm.

In some embodiments, the light emitting diode chip is a miniLED (Mini Light Emitting Diode) chip, and the light board 12 is a miniLED light board, but not limited thereto.

In some embodiments of the present application, the light emitting diode chip 122 is a micro light emitting diode 122, and the size of the chip used in the micro light emitting diode 122 is at the micron level. The light board 12 is a micro light emitting diode light board 12, where the micro light emitting diode 122 is different from ordinary light emitting diodes, and specifically refers to a micro light emitting diode chip.

As the backlight source, the micro light emitting diode light board 12 has a smaller size than traditional light emitting diodes, and can realize more refined dynamic control and improve the dynamic contrast ratio of the display apparatus.

Figure 4:
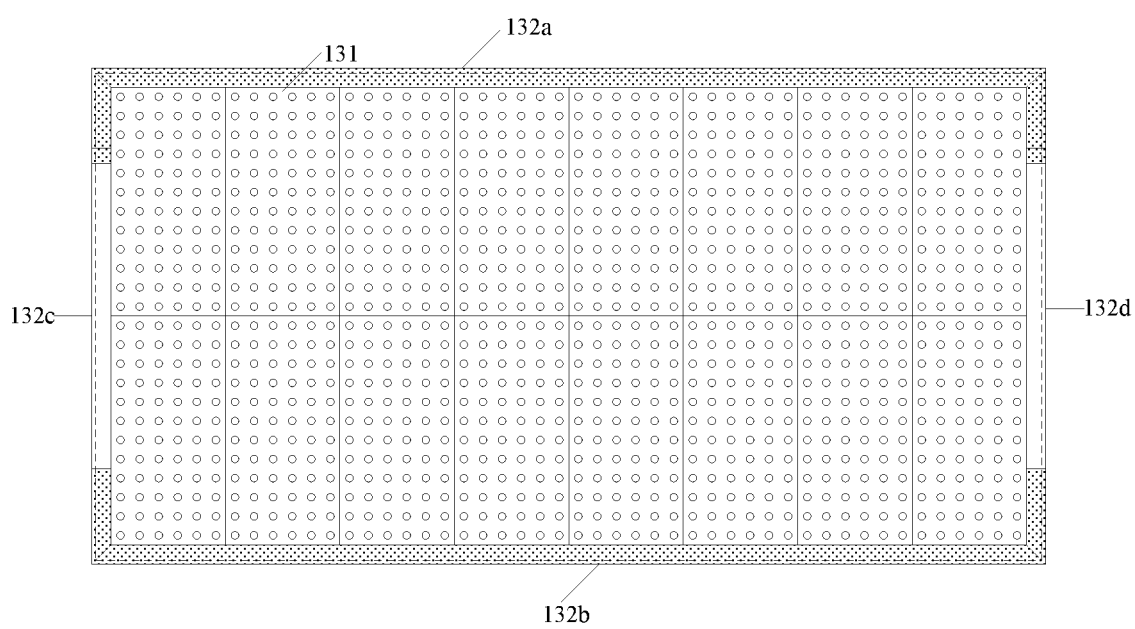
FIG. 4 is a schematic diagram of a top-view structure of a split reflector plate according to an embodiment of the present application.

FIG. 4 is a schematic diagram of a top-view structure of a split reflector plate according to an embodiment of the present application, where the dotted line represents the bent line of the side reflector plate.

Referring to FIG. 4, the split reflector plate 13 includes: a main reflector plate 131 and one or more side reflector plates 132.

The main reflector plate 131 is arranged on the surface of the light board 12 facing away from the back plane 11, and is arranged at the position corresponding to the plane portion 111. The shape and size of the main reflector plate 131 is consistent or matched with the shape and size of the plane portion 111. The main reflector plate 131 includes a plurality of openings for exposing a light emitting device formed by a single packaging bracket 124 and a single light emitting diode chip 122.

Since the main reflector plate 131 needs to punch a large number of holes, the process is more complicated than that of ordinary LED backlight reflector plates. Therefore, it is impossible to attach a whole main reflector plate when applied to a large size display apparatus. In an embodiment of the present application, the size of the main reflector plate 131 is processed according to the size of the light board 12. There are a plurality of light boards 12 and main reflector plates 131, where one main reflector plate 131 corresponds to one light board 12, and the main reflector plates 131 are fitted to the light boards 12 in one-to-one correspondence. In some embodiments, the main reflector plate 131 can be precisely aligned with and fully fit to the light board 12 in a fully glued fitting manner, or can be aligned with and partially fitted to the light board 12 in an adhesive tape fitting manner.

Figure 5:
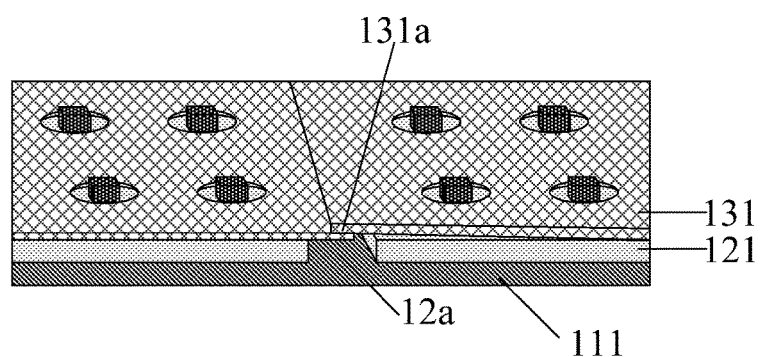
FIG. 5 is a schematic diagram of the local structure of the main reflector plate and the light board according to an embodiment of the present application.

FIG. 5 is a schematic diagram of the local structure of the main reflector plate and the light board according to an embodiment of the present application.

Referring to FIG. 5, the size of the main reflector plate 131 is larger than the size of the corresponding light board 12, so that the portion of the main reflector plate 131 beyond the light board 12 blocks the gap 12a between adjacent light boards 12, so as to avoid the subjective issue caused by the gap defect between adjacent light boards and improve the subjective stability. The subject issue is one or more issues associated with user's subject evaluation of the display effect of a display device.

There may be an overlapping area 131a between adjacent main reflector plates 131 to ensure that the adjacent main reflector plates 131 are in the stacked and overlapped state, effectively blocking the gap 12a between adjacent light boards 12. The overlapping area 131a between adjacent main reflector plates 131 is generally located in the gap 12a between the light boards 12, and the overlapping area 131a between adjacent main reflector plates 131 may be uneven. Therefore, the overlapping area 131a is configured not to overlap with the light boards 12, so as to avoid the overlapping area 131a from affecting the light emission of the light boards 12. Referring to FIG. 2, the side reflector plate 132 is arranged on one side of the inclined portion 112 of the back plane 11 facing the light board 12, the shape and size of the side reflector plate 132 are adapted to the shape and size of the inclined portion 112, and one side of the side reflector plate 132 away from the plane portion 111 covers the bent portion 113. The large-angle light emitted by the light emitting diode chip 122 located at the edge can be reflected by the side reflector plate 132 back to the backlight module for use, or the light reflected by the diffusion plate 14 and the optical film 15 back to the inclined portion 112 can be re-reflected by the side reflector plate 132 to the light-emitting side, and the reflection path of the reflected light is random, so the multiple reflections of the light by the side reflector plate 132 homogenize the light, thereby improving the utilization efficiency of the light source.

Referring to FIG. 4, a plurality of side reflector plates 132 are designed to match the inclined portion 112, and the splicing positions of the plurality of side reflector plates 132 avoid the corner positions of the inclined portion 112. In some embodiments, the positions where the sky-side inclined portion 112a is respectively connected with one end of the left inclined portion 112c and one end of the right inclined portion 112d, and the positions where the ground-side inclined portion 112b is respectively connected with the other end of the left inclined portion 112c and the other end of the right inclined portion 112d are the corner positions of the inclined portion 112. The splicing positions of the plurality of side reflector plates 132 avoid these corner positions, thereby avoiding the shadow problem caused by the splicing deviation of the side reflector plates 132 in the corner positions.

The plurality of side reflector plates 132 include: a sky-side reflector plate 132a, a ground-side reflector plate 132b, a left reflector plate 132c and a right reflector plate 132d, where the sky-side reflector plate 132a is opposite to the ground-side reflector plate 132b, the left reflector plate 132c is opposite to the right reflector plate 132d, the sky-side reflector plate 132a is respectively spliced with one end of the left reflector plate 132c and one end of the right reflector plate 132d, and the ground-side reflector plate 132b is respectively spliced with the other end of the left reflector plate 132c and the other end of the right reflector plate 132d.

Figure 6:
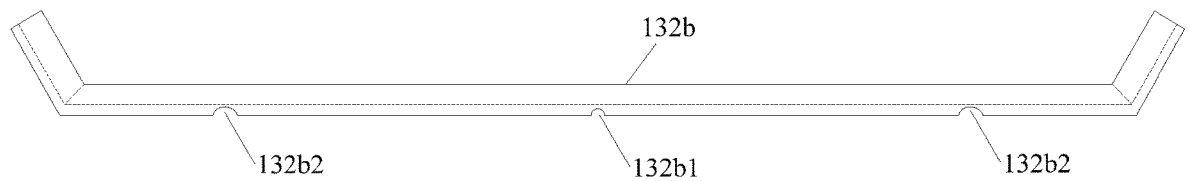
FIG. 6 is a schematic diagram of a top-view structure of a ground-side reflector plate according to an embodiment of the present application.
Figure 7:
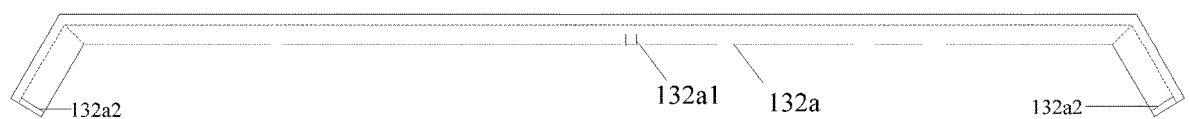
FIG. 7 is a schematic diagram of a top-view structure of a sky-side reflector plate according to an embodiment of the present application.

FIG. 6 is a schematic diagram of a top-view structure of the ground-side reflector plate according to an embodiment of the present application. FIG. 7 is a schematic diagram of a top-view structure of the sky-side reflector plate according to an embodiment of the present application. The dotted lines in the figures represent bent lines of the side reflector plates.

The sky-side reflector plate 132a covers the sky-side inclined portion 112a, and two ends of the sky-side reflector plate 132a extend to the left inclined portion 112c and the right inclined portion 112d, so that the splicing position of the sky-side reflector plate 132a and the left reflector plate 132c is located in the left inclined portion 112c, and the splicing position of the sky-side reflector plate 132a and the right reflector plate 132d is located in the right inclined portion 112d.

The ground-side reflector plate 132b covers the ground-side inclined portion 112b, and two ends of the ground-side reflector plate 132b extend to the left inclined portion 112c and the right inclined portion 112d, so that the splicing position of the ground-side reflector plate 132b and the left reflector plate 132c is located in the left inclined portion 112c, and the splicing position of the ground-side reflector plate 132b and the right reflector plate 132d is located in the right inclined portion 112d.

Referring to FIG. 6 and FIG. 7, the bending angles of the end portions on both sides of the sky-side reflector plate 132a and the ground-side reflector plate 132b are designed according to the inclination angle of the inclined portion 112 in the back plane 11, so that the splicing positions of the side reflector plates 132 avoid the corner positions of the inclined portion 112, thereby avoiding the shadow problem caused by the splicing deviation of the side reflector plates 132 in corner positions.

In order to accurately fit each side reflector plate 132 to the corresponding surface of the inclined portion 112, the alignment design needs to be carried out for different side reflector plates 132.

Figure 8:
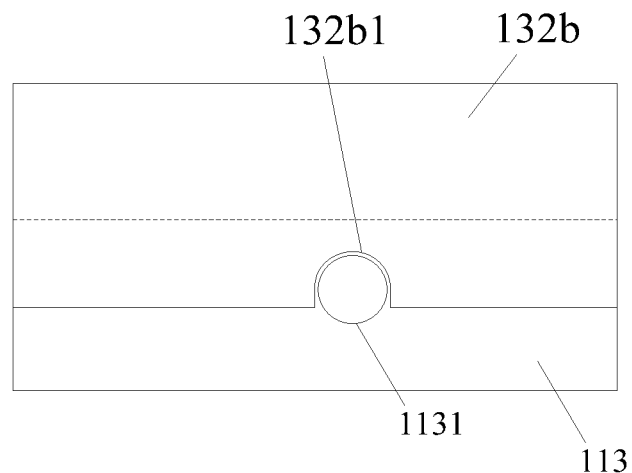
FIG. 8 is a schematic diagram of a partial top-view structure of the bent portion connected with the ground-side reflector plate and the ground-side inclined portion with precise positioning according to an embodiment of the present application.
Figure 9:
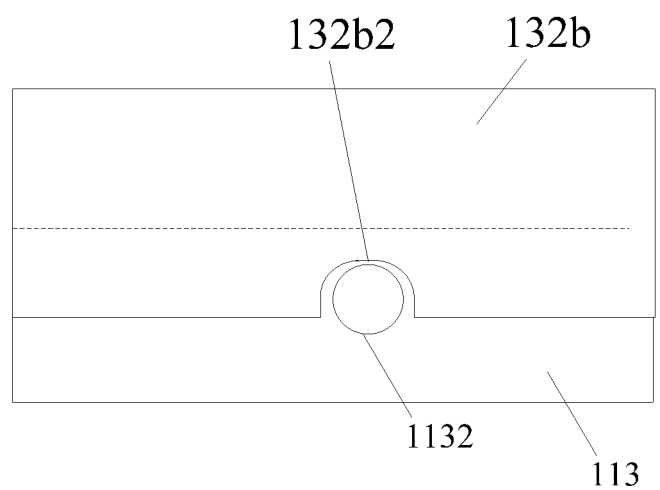
FIG. 9 is a schematic diagram of a partial top-view structure of the bent portion connected with the ground-side reflector plate and the ground-side inclined portion with coarse positioning according to an embodiment of the present application.

FIG. 8 is a schematic diagram of a partial top-view structure of the bent portion connected with the ground-side reflector plate and the ground-side inclined portion with precise positioning according to an embodiment of the present application. FIG. 9 is a schematic diagram of a partial top-view structure of the bent portion connected with the ground-side reflector plate and the ground-side inclined portion with coarse positioning according to an embodiment of the present application. The dotted lines in the figures represent bent lines of the side reflector plates.

Referring to FIG. 6, FIG. 8 and FIG. 9, for the ground-side reflector plate 132b, a fine positioning point convex hull 1131 and a coarse positioning point convex hull 1132 can be provided on the bent portion 113 connected with the ground-side inclined portion 112b. In some embodiments, one fine positioning point convex hull 1131 and two coarse positioning point convex hulls 1132 can be provided, and the two coarse positioning point convex hulls 1132 are located on both sides of the fine positioning point convex hull 1131 respectively. In some embodiments, one side of the ground-side reflector plate 132b away from the plane portion 111 has a fine positioning clamping slot 132b1 matching with the fine positioning point convex hull 1131, and a coarse positioning clamping slot 132b2 matching with the coarse positioning point convex hull 1132. The ground-side reflector plate 132b is designed for alignment according to principle of fine positioning in the middle and coarse positioning in the left and right sides. The coarse positioning in the right and left sides is mainly used to ensure that the ground-side reflector plate 132b is not deviated in the up and down directions, and the fine positioning in the middle is mainly used to ensure that the ground-side reflector plate 132b is not deviated in the left and right directions, improving the stability of the mounting deviation of the ground-side reflector plate 132b.

Figure 10:
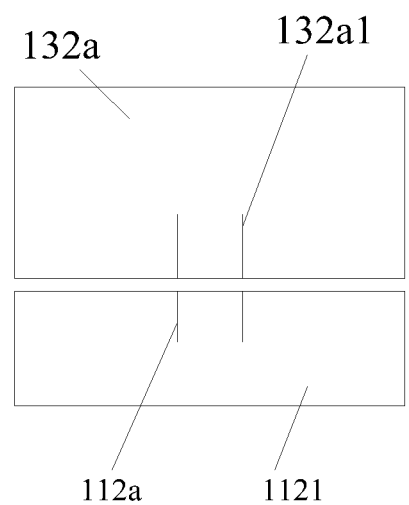
FIG. 10 is a schematic diagram of a partial top-view structure of the sky-side reflector plate and the sky-side inclined portion according to an embodiment of the present application.
Figure 11:
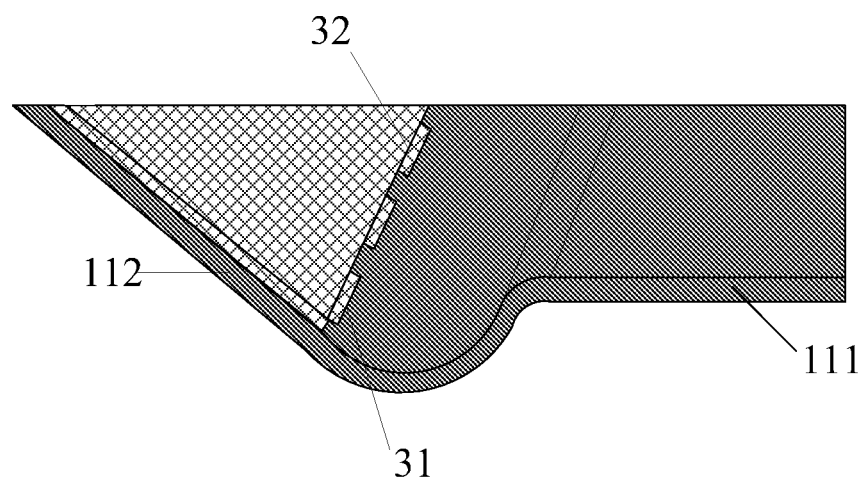
FIG. 11 is a schematic diagram of a partial structure of the positioning groove and the positioning protrusion according to an embodiment of the present application.

FIG. 10 is a schematic diagram of a partial top-view structure of the sky-side reflector plate and the sky-side inclined portion according to an embodiment of the present application. FIG. 11 is a schematic diagram of a partial structure of the positioning groove and the positioning protrusion according to an embodiment of the present application.

Referring to FIG. 10, for the sky-side reflector plate 132a, a dent alignment mark line 1121 may be provided on one side of the sky-side inclined portion 112a adjacent to the plane portion 111, and correspondingly, an alignment tangent line 132a1 matching with the dent alignment mark line 1121 is provided on one side of the sky-side reflector plate 132a adjacent to the plane portion 111. During alignment mounting, the sky-side reflector plate 132a uses the alignment tangent line 132a1 to match and position according to the corresponding dent alignment mark line 1121, ensuring the centering design of the sky-side reflector plate 132a, ensuring that the sky-side reflector plate 132a is not deviated in the left and right directions, and improving the stability of the mounting deviation of the sky-side reflector plate 132a.

Referring to FIG. 11, the sky-side inclined portion 112a also has a positioning groove 31 at the edge adjacent to the plane portion 111, and the edge of the sky-side reflector plate 132a adjacent to the plane portion 111 has a positioning protrusion 32 matching with the positioning groove 31. The positioning protrusion 32 is aligned with the positioning groove 31, ensuring that the sky-side reflector plate 132a is not deviated in the up and down directions, and improving the stability of the mounting deviation of the sky-side reflector plate 132a.

For the left reflector plate 132c and the right reflector plate 132d, an edge of the left inclined portion 112c adjacent to the plane portion 111 is provided with a positioning groove 31, and an edge of the left reflector plate 132c adjacent to the plane portion 111 has a positioning protrusion 32 matching with the positioning groove 31; an edge of the right inclined portion 112d adjacent to the plane portion 111 is provided with a positioning groove 31, and an edge of the right reflector plate 132d adjacent to the plane portion 111 has a positioning protrusion 32 matching with the positioning groove 31. The positioning protrusion 32 is aligned with the positioning groove 31, ensuring that the left reflector plate 132c and the right reflector plate 132d are not deviated in the up and down directions, and improving the stability of the mounting deviation of the left reflector plate 132c and the right reflector plate 132d.

Referring to FIG. 7, two ends of the sky-side reflector plate 132a are respectively provided with edge alignment marks 132a2 for locating edge positions of the left reflector plate 132c and the right reflector plate 132d. The edge positions of the left reflector plate 132c and the right reflector plate 132d are aligned with the edge alignment marks 132a2, ensuring that the left reflector plate 132c and the right reflector plate 132d are not deviated in the left and right directions, and improving the stability of the mounting deviation of the left reflector plate 132c and the right reflector plate 132d.

Referring to FIG. 4, since the edge position of the left reflector plate 132c is aligned with the edge alignment mark 132a2, the left reflector plate 132c overlaps with one edge of the sky-side reflector plate 132a. In order to ensure the accurate alignment, the left reflector plate 132c and the edge of the sky-side reflector plate 132a may be set perpendicular to the edge of the plane portion 111. Similarly, since the edge position of the right reflector plate 132d is aligned with the edge alignment mark 132a2, the right reflector plate 132d overlaps with the other edge of the sky-side reflector plate 132a. In order to ensure the accurate alignment, the right reflector plate 132d and the other edge of the sky-side reflector plate 132a may be set perpendicular to the edge of the plane portion 111.

The diffusion plate 14 is arranged on the light emitting side of the light board 12, and there is a light mixing distance between the diffusion plate 14 and the light board 12. The orthographic projection of the diffusion plate 14 on the back plane 11 covers the orthographic projections of the main reflector plate 131 and the side reflector plates 132 on the back plane 11, that is, the diffusion plate 14 is arranged directly above the entire back plane 11. In some embodiments, the diffusion plate 14 can be set as a rectangle or a square.

The function of the diffusion plate 14 is to scatter the incident light so as to make the light passing through the diffusion plate 14 more uniform. The diffusion plate 14 is provided with scattering particle materials. The light incident on the scattering particle materials will be continuously refracted and reflected, so as to achieve the effect of scattering light and realize the effect of light uniformity.

The diffusion plate 14 has a higher haze and a more uniform effect, and can be processed by extrusion. The diffusion plate 14 can be made from at least one of: polymethyl methacrylate (PMMA), polycarbonate (PC), polystyrene-based material (PS) and polypropylene (PP).

The diffusion plate 14 may also be provided with quantum dot materials to form a quantum dot diffusion plate. When the light emitting diode chip 122 is a light emitting diode chip, the quantum dot materials include red quantum dot material and green quantum dot material, the red quantum dot material emits red light under excitation of blue light, and the green quantum dot material emits green light under excitation of blue light. The red light and green light emitted under excitation are mixed with the transmitted blue light into the white light to emit.

Due to the use of the quantum dot diffusion plate, the quantum dot film is no longer provided in the subsequent process of fabricating the backlight module, which not only reduces the cost, but also makes the display apparatus lighter and thinner.

The optical film 15 is arranged on the side of the diffusion plate 14 facing away from the main reflector plate 131 and the side reflector plates 132. The optical film 15 is arranged in a whole layer, and the shape thereof is substantially same as the shape of the diffusion plate 14 and may usually be set as a rectangle or a square.

The arrangement of the optical film 15 can make the backlight module adapt to various practical applications.

In some embodiments of the present application, the light emitting diode chip 122 may be a blue light emitting diode chip, and the optical film 15 includes a quantum dot layer or a fluorescent layer.

The quantum dot layer includes red quantum dot material and green quantum dot material, the red quantum dot material emits red light under excitation of blue light, and the green quantum dot material emits green light under excitation of blue light. The red light and green light emitted under excitation are mixed with the transmitted blue light into the white light to emit.

The fluorescent layer includes fluorescent materials that are excited to emit red light and green light, and the red light and green light emitted under excitation are mixed with the transmitted blue light into the white light to emit.

In addition, the optical film 15 may also include a prism sheet, which can change the angle of emergence of the light, thereby changing the viewable angle of the display apparatus.

The optical film 15 may also include a reflective polarizer. As a brightness enhancement sheet, the reflective polarizer can increase the brightness of the backlight module, improve the utilization efficiency of light, and simultaneously make the emergent light have the property of polarization, without using the polarizer under the liquid crystal display panel.

The optical film 15 can not only achieve corresponding functions discussed above, but also have fogging and covering effects.

In practical applications, the number of Mini LEDs used in the Mini LED backlight design is more than ten times that of the traditional backlight, the number of Mini LEDs on a single light board is relatively large, and correspondingly the reflector plate also needs to punch many holes. Based on the traditional reflector plate assembly process, it is difficult to achieve the accurate alignment at one time, and the value of the light mixing distance (OD) of the Mini LED backlight design is very small. Once the misalignment or local float of the reflector plate and Mini LED occurs, the emergent light of the nearby Mini LED is correspondingly blocked, resulting in local shadows. It is difficult to guarantee the stability of the backlight visual effect, so the scheme based on the traditional design cannot meet the manufacture requirements for the current Mini LED backlight.

The mounting alignment between the reflector plate and the light board will be discussed below.

Figure 12A:
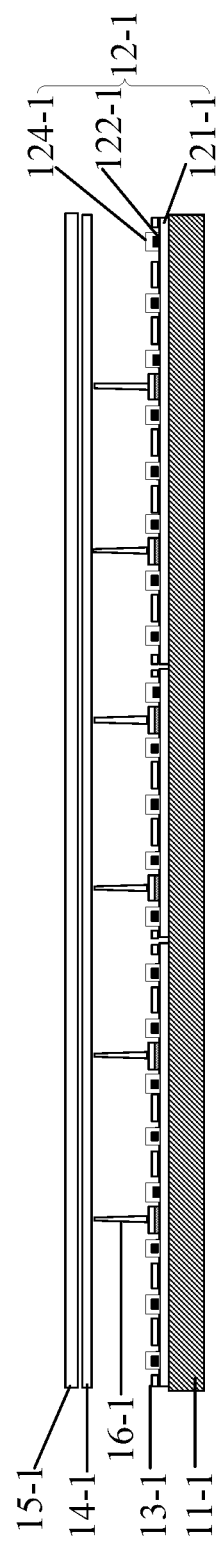
FIG. 12A is a schematic diagram of a cross-section structure of the backlight module according to an embodiment of the present application.
Figure 12B:
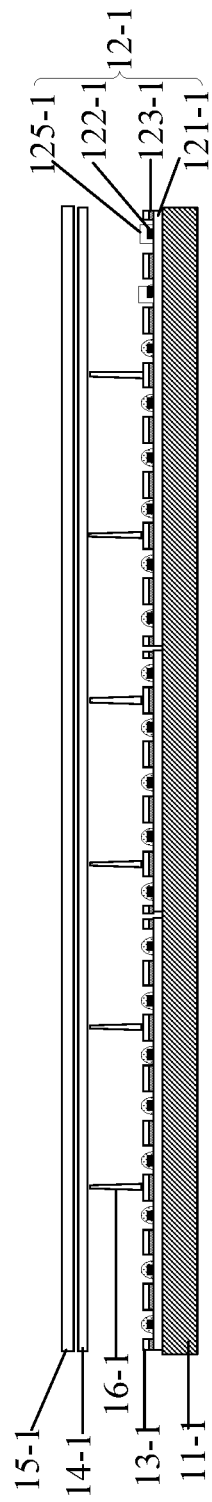
FIG. 12B is a schematic diagram of another cross-section structure of the backlight module according to an embodiment of the present application.

FIG. 12A and FIG. 12B are schematic diagrams of two cross-section structures of the backlight module according to some embodiments of the present application respectively.

Referring to FIG. 12A and FIG. 12B, the backlight module includes: a back plane 11-1, a light board 12-1, a fully glued reflector plate 13-1, a diffusion plate 14-1, an optical film 15-1 and a positioning bracket 16-1.

The back plane 11-1 is configured to fix the light board 12-1 and support and fix the edge positions of the fully glued reflector plate 13-1, the diffusion plate 14-1, the optical film 15-1 and other components. The back plane 11-1 also contributes to heat dissipation for the light board 12-1.

In an embodiment of the present application, the backlight module is a direct-type backlight module, and the light board 12-1 is used as the backlight source. The light board 12-1 is located on the back plane 11-1. In some embodiments, the overall shape of the light board 12-1 can be a rectangle or a square. The light board 12-1 includes many light emitting diode light sources. Since the measuring range of the die bonder is limited and the too large size of the circuit board may also cause many problems such as significant expansion and shrinkage of the board, low precision of pads, etc., the size of the light board 12-1 should not be too large. When applied to a large-sized display apparatus, a plurality of light boards 12-1 are usually spliced together to provide backlight.

In some embodiments, referring to FIG. 12A, the light board 12-1 includes: a circuit board 121-1, a light emitting diode chip (i.e., LED chip) 122-1 and a packaging bracket 124-1. Or, referring to FIG. 12B, the light board 12-1 includes: a circuit board 121-1, a light emitting diode chip 122-1, a reflective layer 123-1 and a packaging glue 125-1, where each light emitting diode chip 122-1 serves as a light emitting unit.

No lens is provided on the light board 12-1 in the embodiment of the present application, and the distance between the light emitting diode chips 122-1 on the light board 12-1 is relatively small.

The circuit board 121-1 is arranged on the back plane 11-1, and the shape of the circuit board 121-1 is substantially same as the overall shape of the light board 12-1. In some embodiments, the circuit board 121-1 is plate-shaped and is generally rectangular or square.

The circuit board 121-1 is configured to provide a drive electrical signal to the light emitting diode chip 122-1. The light emitting diode chip 122-1 and the circuit board 121-1 are manufactured separately. The surface of the circuit board 121-1 includes a plurality of pads for welding the light emitting diode chip 122-1. After the manufacture is completed, the light emitting diode chip 122-1 is transferred to the top of the pad and is welded onto the circuit board 121-1 by reflow welding and other processes, so that the light emitting diode chip 122-1 can be driven to emit light by controlling the input signal of the circuit board 121-1.

In embodiments of the present application, the circuit board 121-1 can be a Printed Circuit Board (PCB), which includes a substrate and a conductive layer. The conductive layer is deposed on the substrate by electroplating the conductive material, and then one or more lines are etched to form a circuit as required. The material of the conductive layer can be copper.

The substrate of the circuit board 121-1 can be made of materials such as FR4, aluminum base or glass. In some embodiments, the base or the base substrate of the circuit board 121-1 may be made of flexible materials to form a flexible display apparatus.

The light emitting diode chip 122-1 is arranged on the circuit board. The electrodes of the light emitting diode chip 122-1 are welded on the exposed pads of the circuit board 121-1 to realize the electrical connection therebetween.

The light board 12-1 may include light emitting diode chips 122-1 in only one color, or may include light emitting diode chips 122-1 in multiple colors, which is not limited here.

The reflective layer 123-1 is arranged on the surface of the circuit board 121-1 close to the light emitting diode chip 122-1, and is an insulating protective layer with the function of protecting the circuit board. In an embodiment of the present application, the reflective layer 123-1 is formed by coating reflective material on the surface of the circuit board 121-1, and then the positions of pads for welding the light emitting diode chip 122-1 are exposed by etching and other processes, to form openings for exposing the light emitting diode chip 122-1.

In an embodiment of the present application, the material used for the reflective layer 123-1 is white ink with the property of reflecting light.

The light emitting diode chip 122-1 can be packaged in two ways: Package-on-Board, POB, or Chip On Board, COB.

Referring to FIG. 12A, when the light emitting diode chip is packaged by the POB packaging method, a packaging bracket 124-1 may be provided outside the light emitting diode chip, where the packaging bracket 124-1 is configured to package and protect the light emitting diode chip 122-1, and prevent foreign objects from entering into the light emitting diode chip 122-1.

In some embodiments of the present application, when the light emitting diode chip is packaged by the POB packaging method, a patch electrode may be formed on the lower surface at the same time, where the patch electrode is electrically connected with the corresponding electrode of the light emitting diode chip. After packaging, the packaged light emitting diode chip 122-1 is patched onto the corresponding position of the circuit board 121-1. The POB packaging method has mature technology and good adaptability. In this embodiment, a single packaging bracket 124-1 and a single light emitting diode chip 122-1 form a light emitting device.

The POB packaging method is to firstly package the light emitting diode chip into a single LED lamp bead through the packaging bracket, and then put the lamp bead on the circuit board.

Referring to FIG. 12B, in another embodiment of the present application, the light emitting diode chip is packaged by the COB packaging method, where the light emitting diode chip 122-1 is firstly welded onto the corresponding pad of the circuit board 121-1, and then the light emitting diode chip 122-1 is packaged by dispensing glue on the surface of the light emitting diode chip 122-1. The packaging glue 125-1 on the surface of the light emitting diode chip 122-1 can be made of transparent colloidal material, such as silica gel with better permeability, modified silica gel or epoxy resin, etc. The COB packaging method has higher efficiency and lower cost.

The size of the chip used by the light emitting diode chip 122-1 is at the micron level. Since the size of the light emitting diode chip 122 is very small, it is beneficial to control the dynamic light emission of the backlight module to the smaller partition, thus realizing more refined dynamic control and improving the dynamic contrast ratio of the display apparatus.

In some embodiments of the present application, the size of the light emitting diode chip 122 is below 500 μm.

In some embodiments, the light emitting diode chip is a miniLED (Mini Light Emitting Diode) chip, and the light board 12-1 is a miniLED light board, but not limited thereto.

In some embodiments of the present application, the light emitting diode chip 122 is a micro light emitting diode 122, and the size of the chip used in the micro light emitting diode 122 is at the micron level. The light board 12 is a micro light emitting diode light board 12, where the micro light emitting diode 122-1 is different from conventional light emitting diodes, and refers to a micro light emitting diode chip.

As the backlight source, the micro light emitting diode light board 12 has a smaller size than traditional light emitting diodes, and can realize more refined dynamic control and improve the dynamic contrast ratio of the display apparatus.

Figure 13:
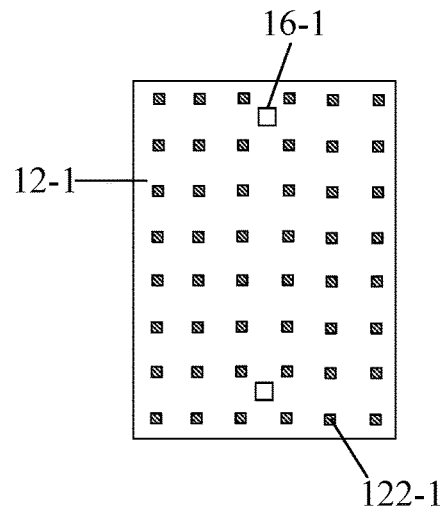
FIG. 13 is a schematic diagram of a top-view structure of a light board according to an embodiment of the present application.
Figure 14:
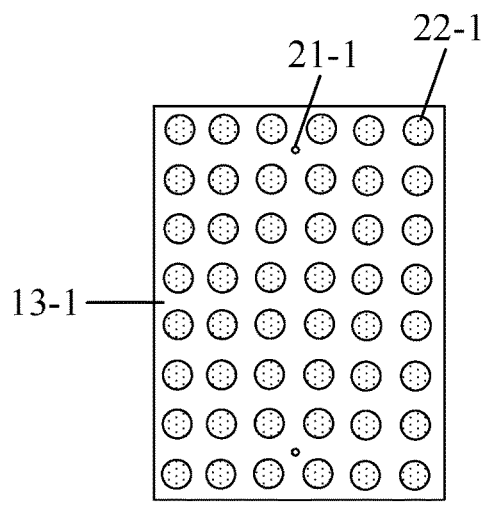
FIG. 14 is a schematic diagram of a top-view structure of a fully glued reflector plate according to an embodiment of the present application.

FIG. 13 is a schematic diagram of a top-view structure of the light board according to an embodiment of the present application. FIG. 14 is a schematic diagram of a top-view structure of the fully glued reflector plate according to an embodiment of the present application.

Referring to FIG. 13, on the circuit board 121-1 of a light board 12-1, the positioning brackets 16-1 are distributed at intervals between the light emitting diode chips 122-1 to avoid affecting the light output of the light emitting diode chips 122-1.

Referring to FIG. 14, the fully glued reflector plate 13-1 includes a positioning opening 21-1 for exposing the positioning bracket 16-1, and an opening 22-1 for exposing the light emitting diode chip 122-1, where the positioning opening 21-11 is designed to match the positioning bracket 16-1, and the opening 22-1 is designed to match the light emitting diode chip 122-1.

The positioning bracket 16-1 generally adopts a pyramid design; and the bottom pad can adopt a square SMT package pad design with a size of 4*4 mm or a glue dispensing package design, and functions to position the fully glued reflector plate 13-1 and support the diffusion plate 14-1, to make an accurate reference for precisely positioning the fully glued reflector plate 13-1. The size of the positioning opening 21-1 in the fully glued reflector plate 13-1 is larger than the size of the positioning bracket 16-1, and for example, is larger than the size of the bottom pad by about 0.2 mm.

In some embodiments, the material of the positioning bracket 16-1 includes polycarbonate PC.

Referring to FIG. 12A and FIG. 12B, a fully glued reflector plate 13-1 and a light board 12-1 may be double precisely positioned by two positioning brackets 16-1, and the arrangements of the two positioning brackets 16-1 may be consistent. During the full lamination of the fully glued reflector plate 13-1, the positioning hole 21-1 of the fully glued reflector plate 13-1 is positioned transiently and precisely from top to bottom from the top of the positioning bracket 16-1, and then laminated by a laminating fixture. Such design can ensure the flatness of the light board 12-1 and the fully glued reflector plate 13-1 after the full lamination, and improve the assembly stability.

Since the reflector plate needs to punch a large number of holes, the process is more complicated than that of ordinary LED backlight reflector plates. Therefore, it is impossible to attach a whole reflector plate when applied to a large size display apparatus. In an embodiment of the present application, the size of the fully glued reflector plate 13-1 is processed according to the size of the light board 12-1. There are a plurality of light boards 12-1 and fully glued reflector plates 13-1, where one fully glued reflector plate 13-1 corresponds to one light board 12-1, and the fully glued reflector plates 13-1 are mounted to the light boards 12-1 in one-to-one correspondence through the positioning brackets 16-1. In some embodiments, the fully glued reflector plate 13-1 can be precisely aligned with and fully mounted to the light board 12-1 in a fully glued lamination manner, which can ensure that the reflector plate does not float high, improve the stability of consumer's subjective visual effect of the Mini LED display, and simultaneously improve the stability of the mounting deviation of the reflector plate, compared to the case of being aligned with and partially mounting to the light board 12 in the adhesive tape lamination manner in related art.

Figure 15:
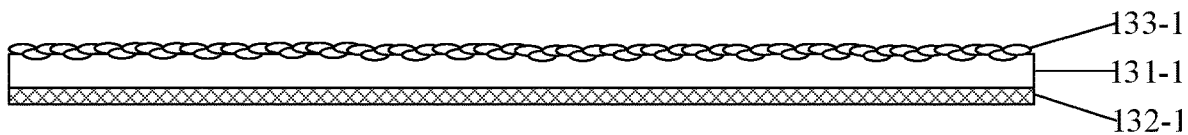
FIG. 15 is a schematic diagram of a cross-section structure of the fully glued reflector plate according to an embodiment of the present application.

Referring to FIG. 15, the fully glued reflector plate 13-1 may include: a base material 131-1 and a glue layer 132-1.

The base material 131-1 has supporting and reflecting functions, and the material of the base material 131-1 includes PET.

The glue layer 132-1 is arranged on the side of the base material 131-1 facing the light board 12-1, and is configured to be fully laminated with the light board 12-1. The material of the glue layer 132-1 includes bilobal acrylic.

The fully glued reflector plate 13-1 is manufactured by the DXC full glue coating process. Different from the adhesive tape lamination or mounting method used for the ordinary Mini LED reflector plate, the glue coating process together with the bilobal acrylic glue has stable performance, and the control of the film thickness is more accurate and stable, ensuring the mounting or lamination reliability.

Figure 16:
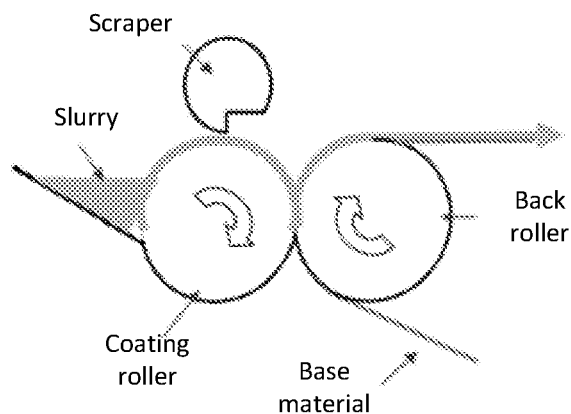
FIG. 16 is a schematic diagram of a coating equipment when fabricating the fully glued reflector plate according to an embodiment of the present application.

FIG. 16 is a schematic diagram of a coating equipment when manufacturing the fully glued reflector plate according to an embodiment of the present application.

Referring to FIG. 16, the manufacture process of the glue layer 132-1 in the fully glued reflector plate 13-1 includes: glue formula→film application→film balance→glue application→drying→corona→coating→curing→detecting-→winding.

Glue formula: prepare the glue according to one or more formula parameters.

Film application: put base material onto a roller.

Film balance: by stretching up and down of a plurality of rollers to correct the inclination and deviation of the base material during transmission process.

Glue application: inject prepared glue into a gluing equipment.

Drying: dry the glue to cause the glue enter into semi-liquid state to prepare for the subsequent coating process.

Corona: perform corona process treatment on the surface of the base material, so that the surface of the base material has higher adhesion and is firmer after being coated with the glue.

Coating: coat the base material with glue by the coating equipment.

Curing: cure the coated base material to make the glue fully adhere to the base material.

Detecting: check the flatness consistency of the coated base material.

Winding: add a layer of release film to the glue layer and simultaneously roll up for packaging the roll material through a winding equipment.

Referring to FIG. 15, the fully glued reflector plate 13-1 may further include: a scattered particle layer 133-1. The scattered particle layer 133-1 is located on one side of the base material 131-1 away from the glue layer 132-1 and configured to increase the emergent direction of the reflected light.

Figure 17:
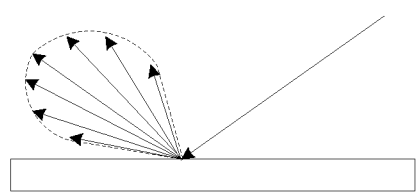
FIG. 17 is a schematic diagram of the reflected light of the fully glued reflector plate according to an embodiment of the present application.
Figure 18:
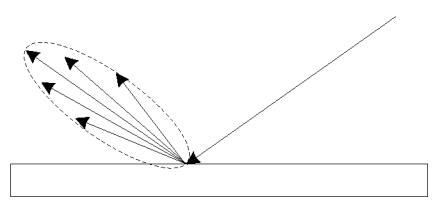
FIG. 18 is a schematic diagram of the reflected light from a reflector plate in the related art.

FIG. 17 is a schematic diagram of the reflected light of the fully glued reflector plate according to an embodiment of the present application. FIG. 18 is a schematic diagram of the reflected light from a reflector plate in the related art.

Referring to FIG. 17 and FIG. 18, when the light emits to the fully glued reflector plate 13-1, the scattered particle layer 133-1 can increase the emergent direction of the reflected light, making the overall emergent light more uniform.

The parameter design specification of the fully glued reflector plate 13-1 is as follows.

| Item | Unit | Parameter Design Value |
|---|---|---|
| Total Thickness | μm | 185 ± 10 |
| Bondline Thickness | μm | 20 ± 10 |
| Reflectance | % | ≥96.6 |
| Gloss | % | 25 ± 5 |
| Tensile Strength | Mpa | MD ≥ 75/TD ≥ 60 |
| Tensile Elongation | % | MD ≥ 30/TD ≥ 25 |
| Heat Shrinkage (85° C., 30 min) | % | MD ≤ 0.4/TD ≤ 0.2 |
| Release Force | gf/inch | 2500 ± 500 |

The above design ensures that the thickness size of the fully glued reflector plate 13-1 is uniform and stable, and the optical reflectivity is high and the thermal stability is good.

The diffusion plate 14-1 is arranged on the light emitting side of the light board 12-1, and has a certain distance from the fully glued reflector plate 13-1. The shape of the diffusion plate 14-1 is substantially same as the shape of the light board 12-1. In some embodiments, the diffusion plate 14-1 can be set as a rectangle or a square.

The function of the diffusion plate 14-1 is to scatter the incident light so as to make the light passing through the diffusion plate 14-1 more uniform. The diffusion plate 14-1 is provided with scattering particle materials. The light incident on the scattering particle materials will be continuously refracted and reflected, so as to achieve the effect of scattering light and realize the effect of light uniformity.

The diffusion plate 14-1 has a higher haze and a more uniform effect, and can usually be processed by extrusion. The material of the diffusion plate 14-1 includes at least one of polymethyl methacrylate (PMMA), polycarbonate (PC), polystyrene-based material (PS) and polypropylene (PP).

The optical film 15-1 is arranged on the side of the diffusion plate 14-1 facing away from the reflector plate 13-1. The optical film 15-1 is arranged in a whole layer, and the shape thereof is substantially same as the shape of the lamp plate 12-1 and may usually be set as a rectangle or a square.

The arrangement of the optical film 15-1 can make the backlight module adapt to various practical applications.

In an embodiment of the present application, the light emitting diode chip in the light board 12-1 may be a blue light emitting diode chip, and the optical film 15-1 includes a quantum dot layer or a fluorescent layer.

The quantum dot layer includes red quantum dot material and green quantum dot material, the red quantum dot material emits red light under excitation of blue light, and the green quantum dot material emits green light under excitation of blue light. The red light and green light emitted under excitation are mixed with the transmitted blue light into the white light to emit.

The fluorescent layer includes fluorescent materials that are excited to emit red light and green light, and the red light and green light emitted under excitation are mixed with the transmitted blue light into the white light to emit.

In addition, the optical film 15-1 may also include a prism sheet, which can change the angle of emergence of the light, thereby changing the viewable angle of the display apparatus.

The optical film 15-1 may also include a reflective polarizer. As a brightness enhancement sheet, the reflective polarizer can increase the brightness of the backlight module, improve the utilization efficiency of light, and simultaneously make the emergent light have the property of polarization, without using the polarizer under the liquid crystal display panel.

The diffusion plate 14-1 needs to cover the area where all the light boards 12-1 are located, has a relatively large size and is prone to collapse and warp deformation, to deteriorate the optical characteristics of the backlight module and even damage the light emitting diode chip 122-1. Therefore, the positioning bracket 16-1 can also serve for supporting the diffusion plate 14-1.

The positioning bracket 16-1 can be fixed on the light board 12-1 by buckle, screw or paste.

Figure 19:
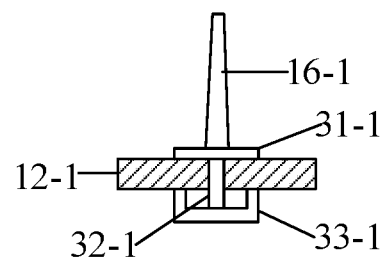
FIG. 19 is a first schematic diagram of the connection relationship between the positioning bracket and the light board according to an embodiment of the present application.
Figure 20:
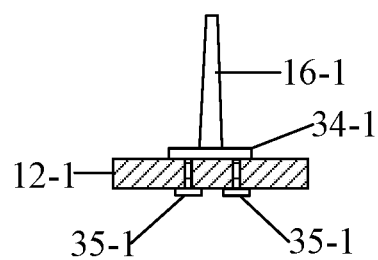
FIG. 20 is a second schematic diagram of the connection relationship between the positioning bracket and the light board according to an embodiment of the present application.
Figure 21:
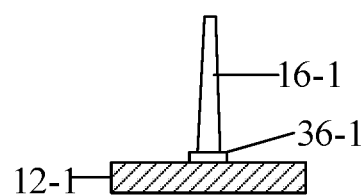
FIG. 21 is a third schematic diagram of the connection relationship between the positioning bracket and the light board according to an embodiment of the present application.

FIGS. 19 to 21 are schematic diagrams of the connection relationship between the positioning bracket and the light board according to some embodiments of the present application.

Referring to FIG. 19, the positioning bracket 16-1 is fixed on the light board 12-1 through a limiting sheet 31-1, an auxiliary cylinder 32-1 and a buckle 33-1, where the limiting sheet 31-1 and the buckle 33-1 are respectively located at both ends of the auxiliary cylinder 32-1. After the buckle 33-1 is closed, the limiting sheet 31-1 and the buckle 33-1 clamp the light board 12-1 to fix the positioning bracket 16-1 on the light board 12-1.

Referring to FIG. 20, the positioning bracket 16-1 is connected with a base 34-1, the base 34-1 is fixed on the light board 12-1 by a screw 35-1, and the bracket 16-1 can be disassembled by rotating the screw 35-1.

Referring to FIG. 21, the positioning bracket 16-1 is directly attached on the surface of the light board 12-1 through a colloid 36-1 (such as double-sided tape, solid glue or liquid).

It should be noted that the above-mentioned embodiments are discussed taking a light board as an example of the light source, but not limited thereto. The light source may also be of other light source forms such as light bar. Meanwhile, the above-mentioned embodiments are discussed with the micro light emitting diode light board as an example, but not limited thereto for those skilled in the art. Other LED light-emitting device components are also possible, such as micro LED or ordinary LED light-emitting devices.

Apparently, those skilled in the art can make various modifications and variations to the present application without departing from the spirit and scope of the present application. Thus the present application is also intended to cover these modifications and variations therein as long as these modifications and variations to the present application fall into the scope of the claims of the present application.

What is claimed is:

1. A display apparatus, comprising:
  a display panel, configured to display images;
  a backlight module, arranged on a light-incident side of the display panel and configured to provide backlight;
  wherein the backlight module comprises:
  a back plane comprising a plane portion and an inclined portion surrounding the plane portion, wherein the inclined portion inclines toward a light emitting side of the backlight module, and the inclined portion and the plane portion are arranged at a configured angle;
  a light board, arranged on the plane portion of the back plane and configured to provide backlight to the display panel;

a split reflector plate, comprising a main reflector plate and a plurality of side reflector plates; wherein the main reflector plate is arranged on a side of the light board facing away from the back plane, the plurality of side reflector plates are arranged on a side of the inclined portion of the back plane facing the light board, and splicing positions of the plurality of side reflector plates do not overlap with corner positions of the inclined portion.

2. The display apparatus according to claim 1, wherein the backlight module comprises a plurality of light boards and a plurality of main reflector plates; and the main reflector plates are mounted to the light boards in one-to-one correspondence.

3. The display apparatus according to claim 2, wherein a size of a main reflector plate among the plurality of main reflector plates is larger than a size of a corresponding light board among the plurality of light boards;

a gap with a set value is arranged between adjacent light boards among the plurality of light boards, and the gap is completely covered by a corresponding main reflector plate among the plurality of main reflector plates.

4. The display apparatus according to claim 3, wherein there is an overlapping area between adjacent main reflector plates among the plurality of main reflector plates.

5. The display apparatus according to claim 4, wherein the overlapping area is located in the gap, and the overlapping area and one or more light boards among the plurality of light boards do not overlap with each other.

6. The display apparatus according to claim 1, wherein the plurality of side reflector plates comprise: a sky-side reflector plate, a ground-side reflector plate, a left reflector plate and a right reflector plate;

the inclined portion of the back plane comprises: a sky-side inclined portion, a ground-side inclined portion, a left inclined portion and a right inclined portion;

the sky-side reflector plate covers the sky-side inclined portion, and two ends of the sky-side reflector plate extend to the left inclined portion and the right inclined portion respectively;

the ground-side reflector plate covers the ground-side inclined portion, and two ends of the ground-side reflector plate extend to the left inclined portion and the right inclined portion respectively.

7. The display apparatus according to claim 6, wherein the back plane further comprises a bent portion in connection with a side of the inclined portion away from the plane portion, the bent portion is parallel with the plane portion, and the plurality of side reflector plate further covers the bent portion;

the bent portion in connection with the ground-side inclined portion is provided with a fine positioning point convex hull and a coarse positioning point convex hull;

a side of the ground-side reflector plate away from the plane portion has a fine positioning clamping slot matching with the fine positioning point convex hull and a coarse positioning clamping slot matching with the coarse positioning point convex hull.

8. The display apparatus according to claim 6, wherein a side of the sky-side inclined portion adjacent to the plane portion has a dent alignment mark line, and a side of the sky-side reflector plate adjacent to the plane portion has an alignment tangent line matching with the dent alignment mark line;

an edge of the sky-side inclined portion adjacent to the plane portion has a positioning groove, and an edge of the sky-side reflector plate adjacent to the plane portion has a positioning protrusion matching with the positioning groove of the sky-side inclined portion.

9. The display apparatus according to claim 6, wherein an edge of the left inclined portion adjacent to the plane portion has a positioning groove, and an edge of the left reflector plate adjacent to the plane portion has a positioning protrusion matching with the positioning groove of the left inclined portion;

an edge of the right inclined portion adjacent to the plane portion has a positioning groove, and an edge of the right reflector plate adjacent to the plane portion has a positioning protrusion matching with the positioning groove of the right inclined portion;

two ends of the sky-side reflector plate close to the left reflector plate and close to the right reflector plate are respectively provided with edge alignment marks for locating edge positions of the left reflector plate and edge positions of the right reflector plate.

10. The display apparatus according to claim 9, wherein adjacent edges of the left reflector plate and the sky-side reflector plate overlap with each other, and an overlapping edge of the left reflector plate and the sky-side reflector plate are perpendicular to an edge of the plane portion;

adjacent edges of the right reflector plate and the sky-side reflector plate overlap with each other, and an overlapping edge of the right reflector plate and the sky-side reflector plate are perpendicular to the edge of the plane portion.

* * * * *